Nov. 15, 1949   R. W. NOOJIN   2,488,229
COMBINATION LEAD AND BRASS UNION
Filed Oct. 10, 1947

Inventor
Ralph W. Noojin

By Clarence A. O'Brien
and Harvey B. Jacobson
Attorneys

Patented Nov. 15, 1949

2,488,229

UNITED STATES PATENT OFFICE 2,488,229

COMBINATION LEAD AND BRASS UNION

Ralph W. Noojin, Gadsden, Ala.

Application October 10, 1947, Serial No. 779,189

2 Claims. (Cl. 285—115)

The present invention relates to a two-part union which is especially, but not necessarily, adapted for use in plumbing work and particularly as a drainage fitting, beneath and in connection with fixtures such as toilet commodes, urinals and the like, lavatory wash basins, kitchen sinks and equivalent structures, whereby to provide a satisfactory connection or coupling between the fixture and coacting drainage pipe line.

Drain pipes between fixtures, such as commode bowls and the like, and which connect up with soil and waste pipes are subject to handling not only gas and water pressures but a considerable amount of solid matter. Therefore such devices as use a union between the fixtures and the drain pipes require merging joints which are as mechanically smooth as reasonably possible.

The method at present used by plumbers leaves a rather rough joint between the parts which go to make up the union and in turn diminishes the size of the passage between the brass ferrule and lead pipe section which go to make up said union. Not only this, it is a matter of common knowledge that the installation of such a union of lead pipe and brass ferrule requires the presence and services of an expert plumber to wipe the joint where the ferrule unites or connects with the lead pipe. Then too, the method now followed by ordinary plumbers consists of inserting a short length of lead pipe into the brass ferrule at one end of the latter and bonding the two together by means of heating the joint to slightly below the melting point of lead and then pouring the hot solder around the joint from the outside until the union is permanently made between the lead pipe and brass ferrule so that a water and gas proof connection is had, sufficient to withstand pressure of several pounds or more. The joint is then heated and smoothed up and all unnecessary solder is removed to provide the now commonly known wiped joint.

In reducing to practice the principles of the instant invention one aspect thereof is to manufacture the complete unit in advance, that is, to provide a pre-constructed drainage fitting or unit which is made up of an especially constructed length of lead pipe and a threaded and interconnected brass ferrule, making it possible to do away with the wiped joint and also possible for a so-called novice plumber to make the necessary connection between a commode bowl or other fixture, my improved fitting, and drain pipe or line.

More specifically, I have evolved and produced a practical union which is made up of a stubby lead pipe having a centrally channelled or grooved hub at one end, the latter serving to accommodate the threaded end of a rigid brass ferrule, the ferrule being flanged at the opposite end for appropriate mechanical association and connection with the coacting part of the drain pipe or line, the joint between the ferrule and hub being soldered to render same gas and water proof and to provide a permanent seal so that strain and vibration will not loosen the joint.

It is well known that building codes require all lead pipes to be joined to cast iron pipes by means of a brass ferrule leaded into hub of cast iron pipe. It is therefore an object of the invention to provide a combination lead pipe and brass ferrule forming a union which is such that it conforms to plumbing code requirements.

Other objects, features and advantages will become more readily apparent from the following description and the accompanying illustrative drawings.

In the drawings, wherein like numerals are employed to designate like parts throughout the same:

Figure 1:
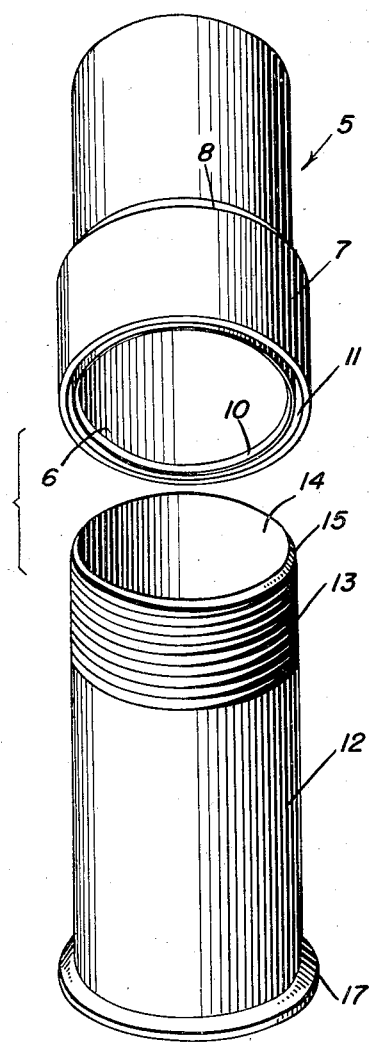
Figure 1 is a perspective view of the stated two-part union or fitting constructed in accordance with the invention, the parts being separated one from the other.

Referring now to the drawings by distinguishing reference numerals the lead pipe section, which connects up with the wash basin, hopper or other fixture is denoted by the numeral 5 and comprises a relatively short stub or length of lead of a kind commonly employed in plumbing installation work. This lead stub is increased in thickness at one end to form a collar-like hub which embodies an endless annular groove or channel defining an inner wall 6 which is a continuation of the main body portion and an outer wall 7, the latter merging and beveling as at 8 into the main body. The free outer edge portion of the wall 7 is cut straight across to provide an abutment shoulder as at 9 while the corresponding edge portion of the inner wall 6 is formed into a feathered bevel as at 10. The opposing inside surfaces of the walls 6 and 7 which go to define the channel 11 are smooth. Therefore when the brass nipple or ferrule 12 is brought into play, a self-threading connection is had. That is to say, the threaded end portion 13 screws automatically and taps itself into the channel, the threads engaging the channel wall of the part 7. The remaining surface 14 at this end of the ferrule is smooth and abuts the smooth wall surface of the wall part 6. It is to be noted also that the terminal end portion 15 is beveled to provide a knife-like edge and this embeds itself firmly into the bottom of said channel. A substantially fluid tight joint is thus afforded between the bottom of the channel and the knife-like edge 15. To provide a more effective seal, after the portion 13 is threaded home, a solder joint is provided as at 16. The remaining end of the ferrule is provided with an annular outstanding flange 17, as customary, and this is adapted to be fastened to adjacent pipe section of the drain line (not shown).

Figure 2:
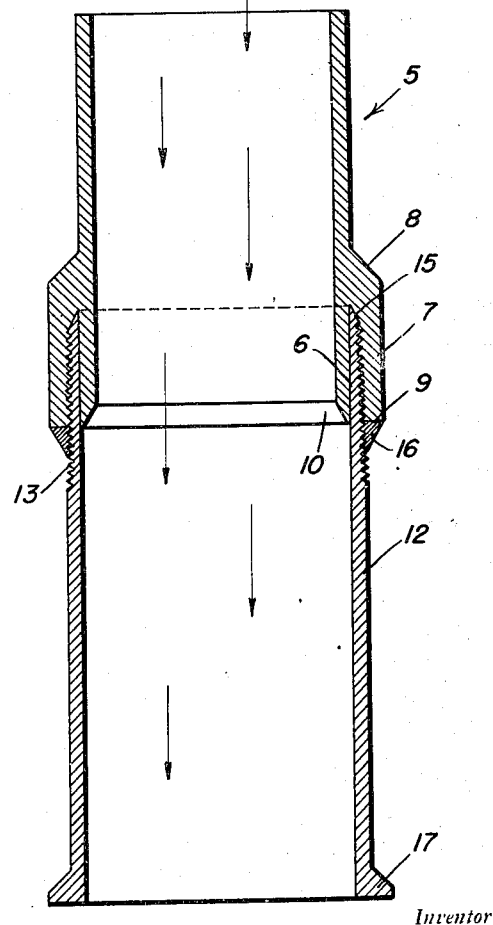
Figure 2 is a longitudinal sectional view with the parts joined for operational use.

It will be noted in connection with the construction shown that the two parts as joined in Figure 2 provide a passageway which is partly lead and partly brass and which is such an internal construction that a substantially uninterrupted bore is had.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. As a new article of manufacture, a ready-made and ready-to-use union for connecting a plumbing fixture, for example, a wash basin, to an iron soil pipe in a manner to meet requirements of average plumbing codes comprising a lead pipe of a predetermined length having a thickened hub at one end, said hub being provided with a channel, and a relatively short brass ferrule externally screw threaded at one end, the latter being screwed permanently into said channel and providing a pressure resisting fluid-tight joint between the lead pipe and ferrule, said ferrule being formed with the usual outstanding assembling and attaching flange at its opposite end, the inner wall of the channeled hub having its free end bevelled and providing a feather edge merging into the adjacent surface of the bore of said ferrule.

2. The structure specified in claim 1, together with a soldered seal arranged exteriorly at the juctural portions of the hub portion and screw threaded end of said ferrule, the threads assisting in effecting a leak-proof solder-joint between the lead pipe and ferrule.

RALPH W. NOOJIN.

REFERENCES CITED

The following references are of record in the file of this patent:

UNITED STATES PATENTS

| Number | Name | Date |
|---|---|---|
| 718,444 | Fleming | Jan. 13, 1903 |
| 1,589,781 | Anderson | June 22, 1926 |
| 1,951,122 | Balze | Mar. 13, 1934 |
| 1,977,432 | Dick | Oct. 16, 1934 |
| 2,336,488 | Litton | Dec. 14, 1943 |
| 2,415,906 | Paige | Feb. 18, 1947 |